(12) United States Patent
Bauer

(10) Patent No.: US 6,547,657 B2
(45) Date of Patent: Apr. 15, 2003

(54) APPARATUS AND BUFFING ELEMENT FOR RECONDITIONING DIGITAL RECORDING DISCS

(76) Inventor: Jason Bauer, 2433 W. Main St., #2007, Mesa, AZ (US) 85201

(*) Notice: Subject to any disclaimer, the term of this patent is extended or adjusted under 35 U.S.C. 154(b) by 39 days.

(21) Appl. No.: 09/754,676

(22) Filed: Jan. 3, 2001

(65) Prior Publication Data

US 2002/0084540 A1 Jul. 4, 2002

(51) Int. Cl.$^7$ ................................................ B24D 11/00
(52) U.S. Cl. ................... 451/538; 451/526; 451/527; 451/530; 451/539
(58) Field of Search ................................ 451/526, 527, 451/530, 538, 539

(56) References Cited

U.S. PATENT DOCUMENTS

| | | |
|---|---|---|
| 3,841,031 A | 10/1974 | Walsh |
| 3,943,666 A | 3/1976 | Dion et al. |
| 4,179,852 A | 12/1979 | Barnett |
| 4,347,689 A | 9/1982 | Hammond |
| 4,556,433 A | 12/1985 | Clausen |
| 4,783,870 A | 11/1988 | Yeung |
| 5,099,618 A | 3/1992 | Schmid |
| 5,102,099 A | 4/1992 | Brown et al. |
| 5,423,103 A | 6/1995 | Born |
| 5,527,215 A * | 6/1996 | Rubino et al. ............ 451/527 |
| 5,593,343 A | 1/1997 | Bauer |
| 5,954,566 A | 9/1999 | Bauer |
| 5,962,120 A * | 10/1999 | Keipert .................... 428/317.9 |
| 6,261,159 B1 * | 7/2001 | Krieg et al. .................. 451/63 |

* cited by examiner

*Primary Examiner*—Joseph J. Hail, III
*Assistant Examiner*—Shantese McDonald
(74) *Attorney, Agent, or Firm*—Lowell W. Gresham; Jordan M. Meschkow; Charlene R. Jacobsen

(57) ABSTRACT

An apparatus (46) for reconditioning a protective surface (30) of an optically-read digital recording disc (20) includes a turntable (48) configured to receive a center hole (24) of the disc (20) and a first motor (52), coupled to the turntable (48), for rotating the turntable (48) and the disc (20) at a first rotational speed. The apparatus further includes a buffing element (50) for removing an amount of material from the protective surface (30) as the turntable rotates the disc (20) and a second motor (54), coupled to the buffing element (50) for rotating the buffing element (50) at a second rotational speed. A timing element (56) synchronizes the first and second motors (52, 54) to substantially simultaneously cease rotation of the turntable (48) and the buffing element (50) following removal of an amount of material from the disc (20). The buffing element (50) includes a substantially rigid stabilizer plate (92) and a foam pad (88, 90) fixedly engaged with a plate surface (96) of the stabilizer plate (92). A buffing pad (82) is in fixed relation with the foam pad (88, 90). The buffing pad has a first surface (102) configured to face the foam pad (88, 90) and a second surface (104) configured to recondition the protective surface (30) of the disc (20).

15 Claims, 3 Drawing Sheets

US 6,547,657 B2

APPARATUS AND BUFFING ELEMENT FOR RECONDITIONING DIGITAL RECORDING DISCS

RELATED PATENTS

The present invention is related to:

"Method and Apparatus for Reconditioning Digital Recording Discs," by Jason Bauer, U.S. Pat. No. 5,954,566, filed Sep. 21, 1999, and incorporated by reference herein.

TECHNICAL FIELD OF THE INVENTION

The present invention relates generally to optically-read digital recording discs. More specifically, the present invention relates to reconditioning the protective surface of digital recording discs.

BACKGROUND OF THE INVENTION

Optically-read digital recording discs, including compact discs (CDs), digital versatile discs (DVDs), CD-ROMs, recordable CDs (CD-Rs), re-writable CDs (CD-RWs), and the like, are widely used to store different types of information. Digital recording discs may be formatted for use with audio, video, or computer equipment that reads the data recorded on the discs. The technology associated with digital discs and digital playback equipment is well known to those skilled in the art. Basically, digital information is encoded and arranged in spiral data tracks within the disc beneath an optically transparent protective layer, or surface, of plastic. A laser beam reads the digital information during playback, and the information is then processed and presented to the user in the form of sound, visual images, or computer data.

The optically transparent protective surface forms the bulk of the thickness and weight of the disc. Generally, the protective surface protects the data layer from damage on the play side. In addition, the protective surface acts as a transparent substrate to support the data layer of the disc. Damage or surface imperfections located on the transparent protective surface can interfere with the laser beam before it reaches the data layer. Although modern playback devices include error correction techniques, this interference can prevent the player from reading the data correctly, or at all, resulting in audible problems, even though the data layer itself is undamaged. Due to the high cost of digital discs, it is desirable to repair such damaged discs rather than replace them.

In recent years, the disc reclamation industry has prospered due to the widespread use and longevity of digital recording discs. However, many used discs cannot be resold because scratches on the protective surface render them unplayable or visually unappealing. Consequently, to improve disc playability and visual appeal, various methods for treating the surface of a CD have been developed. However, these prior art methods suffer from several disadvantages.

One known process for reconditioning digital recording discs involves a motorized apparatus having a buffing surface that abrades the protective surface in a generally uniform manner across the surface area of the disc. While this method may effectively repair the protective surface of some discs, it can leave fine abrasions on other discs so that visual appeal is not restored. Moreover, the fine abrasions can fall into alignment with the spiral data track or otherwise affect the optical tracking quality of the treated disc so that playability is not restored.

Another problem with prior art disc reconditioning devices is that they can leave a ridge-like abrasion pattern. That is, following reconditioning there is a sudden, or stepwise, change between the thickness of an unconditioned portion of the protective surface and a reconditioned portion of the protective surface. A laser beam passing through this sharp demarcation may be undesirably bent or scattered so that the underlying data track or tracks cannot be detected by the playback equipment.

The inability to restore playability may be exacerbated when reconditioning DVDs. DVD playback equipment employs a shorter wavelength laser than the other digital playback equipment. This DVD laser is capable of reading data tracks that are smaller and closer together than the data tracks that can be read by the conventional laser in CD players or CD-ROM drives. Because DVD data tracks are closer together, more of them can fit on a disc of the same size. As a result, DVDs can hold about seven times as much data as an audio CD or a CD-ROM. Unfortunately, fine abrasions remaining on the DVD following reconditioning can adversely affect the playability of the more closely spaced DVD data tracks.

Another result of the different laser in the DVD playback equipment is that the clear protective surface only needs to be about half as thick for a DVD as it does for an audio CD or CD-ROM. Hence, two DVDs can be placed back to back, resulting in two play sides and no label side, thereby further doubling the data capacity of a DVD. Since there is no label side, all manufacturer's identification for the DVD is screen printed onto the narrow text band just outside of the clamping area, or stacking ring, of the DVD.

If a motorized reconditioning apparatus buffs the text band, the manufacturer's identification will be undesirably abraded off leaving the DVD indistinguishable from other unmarked DVDs. This is highly undesirable when the DVDs are to be resold. Such a situation is also undesirable when the DVDs are used in a rental establishment because without the manufacturer's identification on the text band, the DVDs can be easily confused with one another. Thus, there is a need for a disc reconditioning apparatus that does not damage the text band on the digital recording disc.

SUMMARY OF THE INVENTION

Accordingly, it is an advantage of the present invention that an apparatus and buffing element are provided that restore both the playback quality and the visual appearance of an optically-read digital recording disc.

It is another advantage of the present invention that the apparatus and buffing element effectively recondition the protective surface of the disc without causing damage to the text band.

It is yet another advantage of the present invention that the buffing element of the present invention imparts a generally uniform abrasion pattern with a gradual transition between unconditioned and reconditioned portions of the disc.

The above and other advantages of the present invention are carried out in one form by a buffing element in an apparatus for reconditioning a protective surface of an optically-read digital recording disc. The buffing element includes a substantially rigid stabilizer plate having a plate surface and a foam pad fixedly engaged with the plate surface. A buffing pad is in fixed relation with the foam pad, the buffing pad having first and second surfaces on opposing sides of the buffing pad. The first surface is configured to face the foam pad, and the second surface is configured to contact and recondition the protective surface of the digital recording disc.

The above and other advantages of the present invention are carried out in another form by an apparatus for reconditioning a protective surface of an optically-read digital recording disc. The apparatus includes a turntable configured to receive a center section of the optically-read disc, the center section being located about a center hole of the optically-read disc. A first motor, coupled to the turntable, rotates the turntable and the optically-read disc at a first rotational speed. The apparatus further includes a buffing element for removing an amount of material from the protective surface as the turntable rotates the optically-read disc through at least one revolution. The buffing element includes a substantially rigid stabilizer plate having a plate surface, a foam pad fixedly engaged with the plate surface, and a buffing pad in fixed relation with the foam pad. The buffing pad has first and second surfaces on opposing sides of the buffing pad. The first surface is configured to face the foam pad, and the second surface is configured to recondition the protective surface of the digital recording disc. A second motor, coupled to the buffing element, rotates the buffing element at a second rotational speed. A timing element, in communication with each of the first and second motors, synchronizes the first and second motors to substantially simultaneously cease rotation of the turntable and the buffing element following removal of the amount of material.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
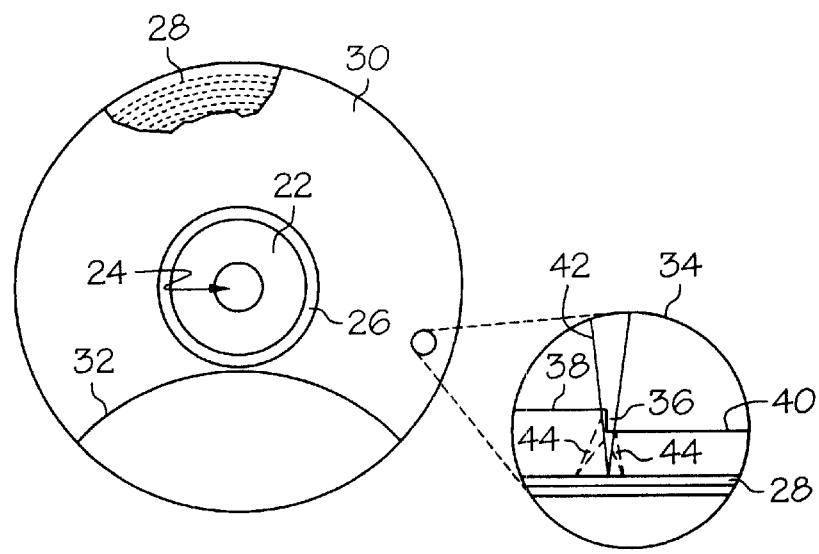
FIG. 1 shows a diagram of an optically-read digital recording disc.

FIG. 1 shows a diagram of an optically-read digital recording disc 20. Optically-read digital recording disc 20 generally includes a center section, or clamping area 22, located about a center hole 24 of disc 20. Surrounding clamping area 22 is a narrow text band 26 typically used to identify the manufacturer. Clamping area 22 and text band 26 to not contain encoded data. A data layer 28 lies outside of text band 26. Data layer 28 is arranged in spiral tracks and is covered by a protective surface 30. Disc 20 is shown with a portion of protective surface 30 removed to show the underlying spiral arranged data layer 28. An abrasion pattern 32 created in accordance with a disc reconditioning apparatus is shown on protective surface 30 and will be described in detail below.

When disc 20 is a music compact disc (CD), the first band of data layer 28 closest to text band 26, called the "lead-in", contains the table of contents for the CD. The lead-in tells the CD playback equipment how to navigate around disc 20. Scratches or other damage in this area can render disc 20 completely unplayable. In a music CD, the song tracks of data layer 28 begin just outside the lead-in. Damage to disc 20 in an area of data outside the lead-in usually affects only the music that is contained in that area. However, with more severe damage the CD playback equipment can sometimes "lock up" on the damaged area so that the laser cannot detect later song tracks.

In general, when disc 20 is undamaged, the laser beam of the disc playback equipment enters disc 20 on the play side, travels through protective surface 30, picks up information from data layer 28, and bounces off a reflective coating on the back side of data layer 28. The reflected laser beam then travels back through protective surface 30, out of disc 20, and into a "detector". The detector then helps the CD player convert the information carried by the laser into sound, video, and/or data.

An expanded side view 34 of a portion of disc 20 represents an exemplary abraded ridge 36 imparted on disc 20 by a prior art disc reconditioning apparatus (not shown). Expanded side view 34 shows an unconditioned portion 38 and a reconditioned portion 40 of disc 20. As shown in expanded side view 34, a reconditioning process using the prior art reconditioning apparatus imparts abraded ridge 36 between unconditioned and reconditioned portions 38 and 40, respectively. A laser beam 42 entering disc 20 through ridge 36 can be undesirably bent or scattered, as represented by dashed lines 44, so that the underlying data layer 28 cannot be accurately detected by the playback equipment.

The present invention reconditions protective surface 30 of disc 20 to remove scratches or other surface imperfections that might otherwise render disc 20 unplayable or visually unappealing. In addition, the present invention reconditions disc 20 outside of text band 26, as represented by abrasion pattern 32, to prevent damage to the manufacturer's identification within text band 26. Furthermore, the present invention removes scratches and other surface imperfections without imparting abrasion ridge 36 onto protective surface 30.

Although disc 20 is generally described as a music CD, it should be understood that optically-read digital recording disc 20 may alternatively be compact disc read-only memory (CD-ROM), a Digital Versatile Disc (DVD), recordable CD (CD-R), and Re-writable CDs (CD-RW), and the like. All of the above listed discs are optical discs that are read with a laser in the fashion described above. The primary difference between the above listed discs is in how the data is encoded in data layer 28 and what is done with that data by the player, drive, or other device used to read it.

Figure 2:
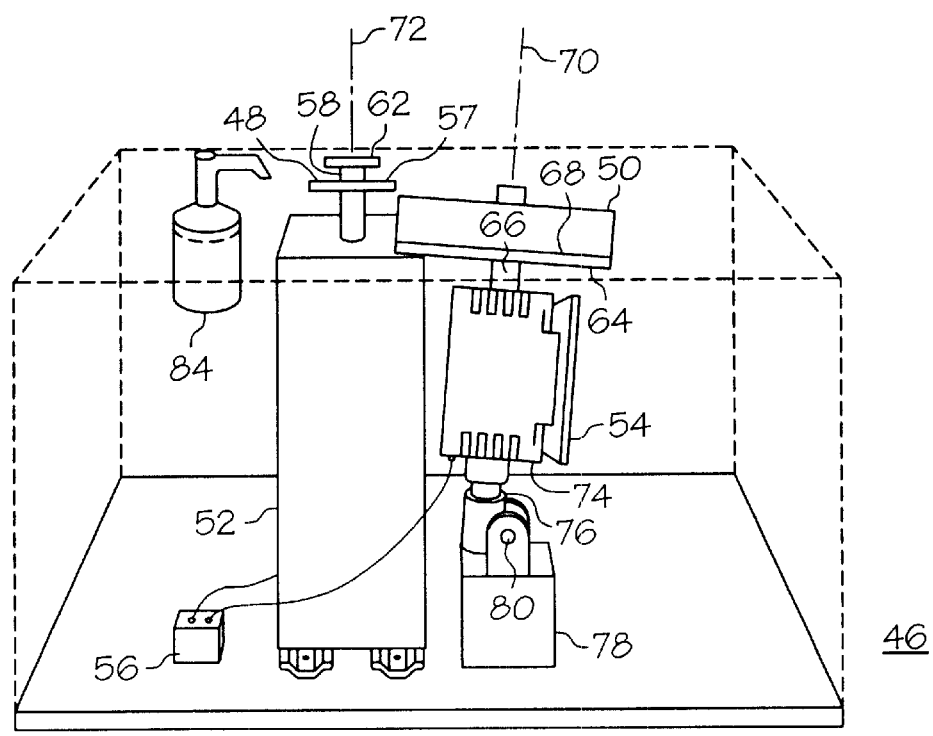
FIG. 2 shows a perspective view of an apparatus for reconditioning protective surface of an optically-read digital recording disc.
Figure 3:
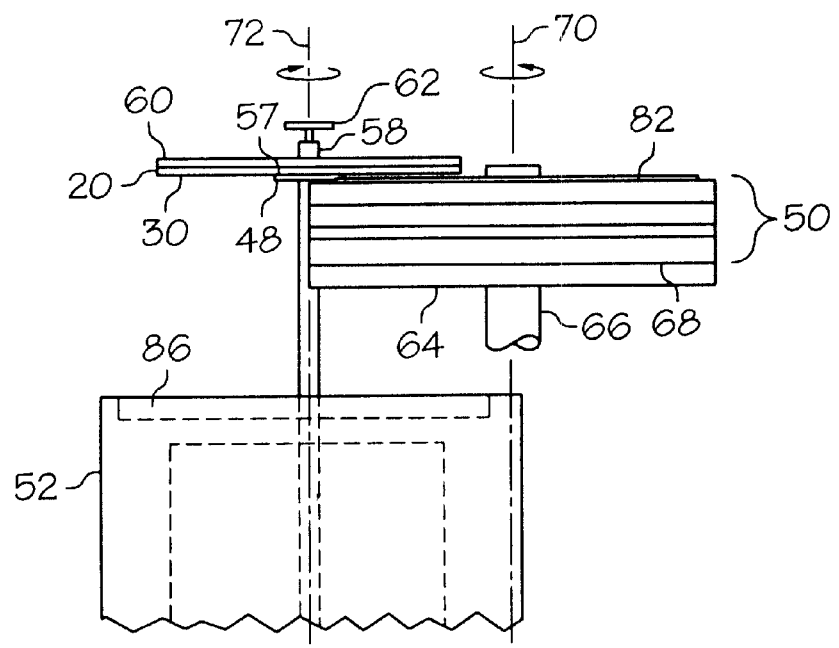
FIG. 3 shows a side view of a turntable and a buffing element of the apparatus of FIG. 2 aligned to recondition a digital recording disc.

Referring to FIGS. 2 and 3, FIG. 2 shows a perspective view of an apparatus 46 for reconditioning protective surface 30 (FIG. 1) of optically-read digital recording disc 20 (FIG. 1). FIG. 3 shows a side view of a turntable 48 and a buffing element 50 aligned to recondition digital recording disc 20 in apparatus 34. Apparatus 46 generally includes turntable 48 and a turntable motor 52 coupled to turntable 48 for rotating turntable 48 at a first rotational speed. Apparatus also generally includes buffing element 50, a buffing element motor 54 coupled to buffing element 50 for rotating buffing element 50 at a second rotational speed, and a timing element 56 coupled to each of turntable motor 52 and buffing element motor 60.

Turntable 48 is configured to support and rotate disc 20 during a reconditioning process. Turntable 48 is preferably formed from a rigid material such as aluminum. Turntable 48 has an upper surface 57 configured to receive clamping area 22 (FIG. 1) located about center hole 24 (FIG. 1) of disc 20. Desirably, turntable 48 is sized so that it contacts and covers most of non-data clamping area 22. Upper surface 57 includes a spindle 58 configured to receive center hole 24 of disc 20. Spindle 58 functions to centrally position clamping area 22 of disc 20 during the reconditioning process.

In operation, disc 20 is positioned on spindle 58 of turntable 48 so that protective surface 30 (FIG. 1) faces turntable 48. Apparatus 46 may optionally include a washer 60 that is positioned over disc 20. Washer 60 is configured to limit flexion of disc 20 during the reconditioning process. Washer 60 is preferably formed from a rigid or at least semi-rigid material, such as plastic or aluminum.

A retainer 62 attaches to spindle 58 and retains washer 60 and disc 20 on spindle 58 of turntable 48. Retainer 62 may be a threaded screw which mates with threads on spindle 58. The relatively large surface area contact between the clamping area 22 and upper surface 57 of turntable 48 and the retention capability of retainer 62 substantially prevent disc 20 from slipping on turntable 48 when force is applied to protective surface 30 of disc 20 during rotation. Those skilled in the art will recognize that there may be other components that can effectively attach retainer 62 to spindle 58. For example, retainer 62 may include a quick-release locking pin mechanism for rapid engagement or disengagement to spindle 58.

A platen 64 supports buffing element 50 during the reconditioning process. Platen 64 is coupled to buffing element motor 54 via a shaft 66. Desirably, platen 64 is sized so that it contacts and supports most of a non-buffing surface 68 of buffing element 50. In addition, platen 64 functions to centrally position and retain buffing element 50 during the reconditioning process.

Buffing element 50 is oriented nearly perpendicular to an axis of rotation 70 of shaft 66. In addition, axis of rotation 70 of shaft 66 is nearly parallel to an axis of rotation 72 of spindle 58. For example, axis of rotation 70 may be tilted about one degree from axis of rotation 72. This nearly parallel alignment of axes 70 and 72 results in a large surface area of buffing element 50 contacting and buffing protective surface 30 during a reconditioning process. Consequently, protective surface 30 is buffed in a generally uniform manner across the surface area of disc 20.

Buffing element motor 54 is oriented along axis of rotation 70 by mounting a rear end 74 of buffing element motor 54 to a first end 76 of a buffing element support 78. Buffing element support 78 may include a pivoting adjuster 80 for adjusting buffing element 50 to produce nearly parallel alignment of axis of rotation 70 of shaft 66 with axis of rotation of spindle 58. Following alignment, pivoting adjuster 80 is locked into position. Of course, those skilled in the art will recognize that there are other adjustment schemes which may be employed to produce this nearly parallel alignment. For example, adjustment screws located between buffing element motor 54 and buffing element 50 may be used to adjust buffing element 50 relative to buffing element motor 54.

In the preferred embodiment of apparatus 46, protective surface 30 of disc 20 is directed in a downward position facing turntable 48, and with only clamping area 22 contacting upper surface 57 of turntable 48. Buffing element 50 includes a planar buffing paper, or buffing pad 82. Buffing pad 82 is directed in an upward position below disc 20 such that a portion of planar buffing pad 82 contacts protective surface 30 outside of text band 26 (FIG. 1) as represented by abrasion pattern 32 (FIG. 1).

The orientation of buffing pad 82 below disc 20 allows disc 20 to be installed and removed from spindle 58 quickly and efficiently. Those skilled in the art will recognize that disc 20 and buffing element 50 may be oriented in other positions, such as sideways, or upside down from the preferred embodiment of apparatus 46, as long as buffing element 50 continues to face protective surface 30.

Timing element 56 is set to synchronize turntable and buffing element motors 52 and 54, respectively, to substantially simultaneously cease rotation of turntable 48 and buffing element 50. In a system that does not include this synchronization, turntable 48 and disc 20 will cease rotating prior to buffing element 50 due to the difference in the rotational speeds between turntable 48 and buffing element 50. This can cause excessive buffing in a limited region of protective surface 30 of the non-rotating disc 20 relative to the remaining area of protective surface 30. An excessively buffed area creates an unbalanced disc. An unbalanced disc (which can spin at rotational speeds of up to 500 RPM during playback) may cause beam focusing problems, vibrations, and signal distortion during playback.

In an exemplary embodiment, buffing element motor 54 rotates buffing element 50 at a first rotational speed of approximately 1000–3400 revolutions per minute (RPM). In contrast, turntable motor 52 rotates turntable 48 at a second rotational speed of approximately 20–30 RPM. Timing element 56 imparts a time delay on turntable motor 52 so that turntable 48 and disc 20 continue spinning slightly longer than buffing element 50. A time delay of approximately one second causes turntable 48 and buffing element 50 to ramp down and cease rotating substantially simultaneously, thus avoiding the formation of the excessively buffed region discussed above.

The rotational speeds of buffing element 50 and turntable 48 cause apparatus 46 to remove a substantially uniform amount of material from protective surface 30 in a time efficient manner so that disc 20 doesn't get too hot. Excessive heat build-up on disc 20 may damage disc 20 so that laser beam 42 (FIG. 1) is unable to focus on data layer 28 (FIG. 1). In addition, apparatus may include a cleaning agent dispenser 84 located proximate turntable 48.

Cleaning agent dispenser 84 dispenses a controlled amount of a cleaning agent to disc 20 to cool disc 20 and to facilitate the removal of waste material from protective surface 30. The cleaning agent may be water for rinsing away the waste material produced by the reconditioning process. Thus, apparatus 46 may include a collection receptacle 86 located proximate turntable 48 for collecting waste material washed off of protective surface 30 by the water. Those skilled in the art will recognize that other cleaning agents may be used. For example, the cleaning agent may be air blown over protective surface 30 to remove the waste material.

The reconditioning process of apparatus 46 causes buffing element 50 to contact and buff protective surface 30 along a path. The path is represented by abrasion pattern 32 in the view depicted in FIG. 1. Buffing element 50 rotates in a substantially outward radial direction with respect to turntable 48. Thus, buffing element 50 removes an amount of material from protective surface 30 in an approximately outward radial direction, represented by abrasion pattern 32. As turntable 48 rotates disc 20 through at least one revolution, this pattern is reproduced a multiplicity of times over protective surface 30 of disc 20. It should be readily apparent to those skilled in the art that buffing element 50 does not etch a scratch corresponding to abrasion pattern 32 into protective surface 30. Rather, abrasion pattern 32 merely describes the path in which buffing element 50 moves on protective surface 30 during the reconditioning process.

The slight tilt of axis of rotation 70 of shaft 66 relative to axis of rotation 72 of spindle 58, and the rotation of buffing element 50 in the substantially outward radial direction, cause the waste material produced by the reconditioning process to be ejected away from protective surface 30. The waste material is then washed away by the cleaning agent dispensed by cleaning agent dispenser 84, thus limiting the undesirable heating of disc 20 while effectively reconditioning protective surface 30.

Figure 4:
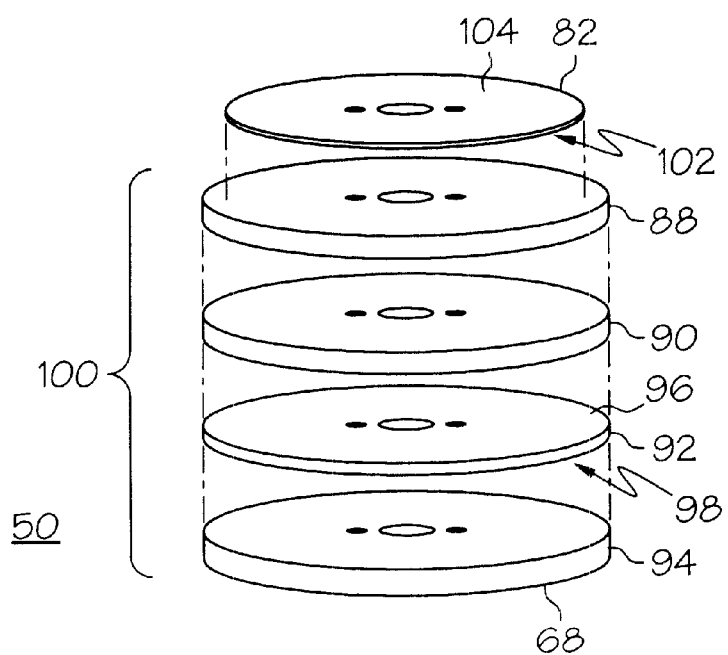
FIG. 4 shows an exploded view of the layers that form the buffing element of FIG. 3.

FIG. 4 shows an exploded view of the layers forming buffing element 50. In a preferred embodiment, buffing element 50 includes buffing pad 82, a closed cell foam pad 88, a first open cell foam pad 90, a substantially rigid stabilizer plate 92, and a second open cell foam pad 94.

Substantially rigid stabilizer plate 92 includes a first plate surface 96 and a second plate surface 98. First open cell foam pad 90 is coupled to first plate surface 96 and second open cell foam pad 94 is coupled to second plate surface 98. In addition, closed cell foam pad 88 is coupled to first open cell foam pad 90. Together, closed cell foam pad 88, first open cell foam pad 90, stabilizer plate 92, and second open cell foam pad 94 form a platform 100 for affixing buffing pad 82.

Buffing pad 82 has a first surface 102 and a second surface 104 on opposing sides of buffing pad 82. First surface 102 is configured to face closed cell foam pad 88. First surface 102 includes pressure sensitive adhesive so that buffing pad 82 may be removably adhered to closed cell foam pad 88. Second surface 104 includes abrasive material and is configured to contact and recondition protective surface 30 (FIG. 1) of disc 20 (FIG. 1).

In a preferred embodiment, closed cell foam pad 88 is a silicone based closed cell foam pad. A closed cell foam is a type of foam in which the chambers in the foam are not interconnected. As such, closed cell foam typically makes good padding and absorbs little water. Thus, closed cell foam pad 88 resists absorbing the cleaning agent provided by cleaning agent dispenser 84 (FIG. 2).

In addition, a silicone based closed cell foam is advantageous because the silicone surface properties provide a firm skin to attach and detach different pressure sensitive adhesives used on first surface 102 of buffing pad 82. If other materials are used this ready attachment and detachment may not occur because the pressure sensitive adhesives used on first surface 102 will begin to permanently attach themselves to the other materials. This permanent attachment will shorten the life of buffing element 50 undesirably leading to additional cost in the form of replacement buffing elements.

Furthermore, the silicone skin surface can be used in a wet environment because it will still allow the attachment of a pressure sensitive backed paper buffing pad 82. This is advantageous when exchanging a current buffing pad 82 for one that has a coarser or finer grit abrasive since even when wet, the silicone skin surface of closed cell foam pad 88 allows the pressure sensitive adhesive to attach securely so that no slippage occurs between buffing pad 82 and closed cell foam pad 88 during operation. Slippage is highly undesirable because wrinkles can be created in buffing pad 82 which causes excessive wear of buffing pad 82 in the area of the wrinkles.

Although closed cell foam pad 88 is described in terms of a silicone based closed cell foam material, it should be understood that in an alternative embodiment, a non-silicone based closed cell foam pad having a silicone coated surface may be used. In yet another embodiment, an open cell foam may be used that has been sprayed or coated with silicone to obtain the properties of water resistance and ready attachment and detachment of buffing pads having pressure sensitive adhesive backing.

Typically, silicone based closed cell foam, such as that used to form closed cell foam pad 88, is relatively stiff to compress. In contrast, open cell foam, such as that used to manufacture first and second open cell foam pads 90 and 94, is relatively easy to compress because the chambers of open cell foam are interconnected. First and second open cell foam pads 90 and 92 may be neoprene or some other material that is soft and readily compressed. Closed cell foam pad 88 and first open cell foam pad 90, juxtaposed between closed cell foam pad 88 and stabilizer plate 92, function cooperatively to press against and apply pressure to buffing pad 82 in order to produce a visually appealing finish on disc 20 (FIG. 1).

In general, a softer buffing element 50 leads to a better final finish. Whereas, a harder buffing element 50 leads to better cut rate for faster material removal. Thus, although first open cell foam pad 90 is described in terms of a soft neoprene foam, and closed cell foam pad 88 is described in terms of a relatively stiff silicone foam, it should be understood that other foam materials may be used to obtain the desired result of final finish or better cut rate.

Stabilizer plate 92 can be plastic, rubber, fiberglass, metal, or other substantially rigid material with little flex. Stabilizer plate 92 creates a firm non-twisting base upon to attach first open cell foam pad 90. Stabilizer plate 92 helps reduce wrinkling of buffing pad 82. In addition, stabilizer plate 92 substantially prevents distortion of buffing element 50 when installing and removing buffing element from platen 64 (FIG. 3) to reduce damage and additional wear on buffing element 50.

Figure 5:
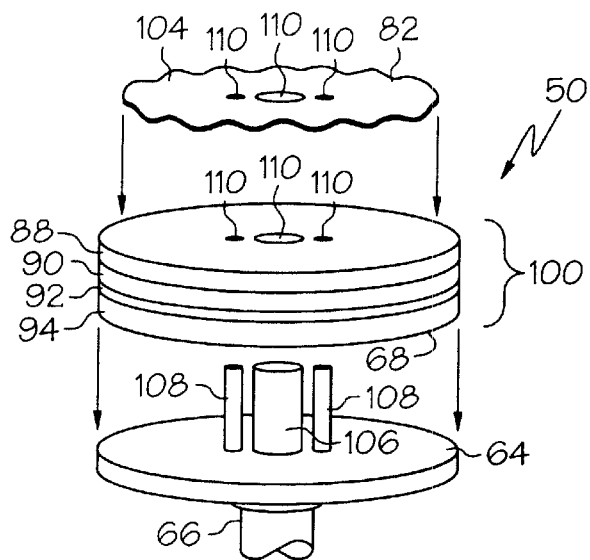
FIG. 5 shows an exploded view of the buffing element being installed on a platen of the apparatus of FIG. 2.

FIG. 5 shows an exploded view of buffing element 50 being installed on platen 64 of apparatus 46 (FIG. 2). Platen 64 includes a center post 106 and two locator pins 108. Platform 100 and buffing pad 82 of buffing element 50 include holes 110 that align with center post 106 and locator pins 108 so that buffing element 50 is installed on platen 64. Locator pins 108 allow accurate location of buffing element 50 onto platen 64 and create resistance against twisting force created by the pressure between buffing element 50 and protective surface 30 (FIG. 1) of disc 20 (FIG. 1)

When buffing element 50 is installed, second open cell foam pad 94 is located between platen 64 and stabilizer plate 92. As such, second open cell foam pad 94 absorbs vibrations between platen and buffing element 50 so as to reduce chatter and quiet the operation of apparatus 46 (FIG. 2).

Figure 6:
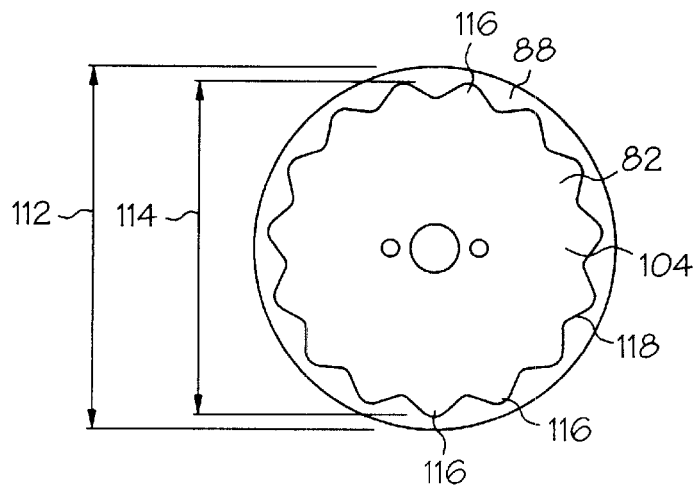
FIG. 6 shows a top view of the buffing pad adhered to the buffing element.

Referring to FIG. 6 in connection with FIG. 5, FIG. 6 shows a top view of buffing pad 82 adhered to closed cell foam pad 88. Closed cell foam pad 88 exhibits a first diameter 112 and buffing pad 82 exhibits a second diameter 114. In addition, buffing pad 82 includes radial projections 116, or scallops, along a perimeter 118 of buffing pad 82.

Figure 7:
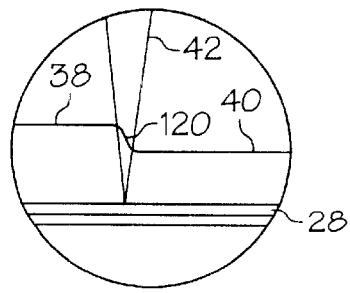
FIG. 7 shows an expanded side view of a reconditioned portion of the digital recording disc.

FIG. 7 shows an expanded side view of a reconditioned portion of disc 20. Radial projections 116 (FIG. 6) of buffing pad 82 (FIG. 6) are configured to impart a sloped edge 120 on a border between unconditioned portion 38 and conditioned portion 40 of protective surface 30. That is, radial projections 116 (FIG. 6) function to break up or "feather" the point of contact of buffing pad 82 with protective surface 30 (FIG. 1) so as to prevent the development of abraded ridge 36 (FIG. 1) on protective surface 30. The resulting sloped edge 120 is less likely to cause bending and scattering of laser beam 42 when penetrating the reconditioned disc than that which is caused by abraded ridge 36 (FIG. 1). As such, radial projections 116 effectively restore playability of disc 20. This is particularly advantageous when reconditioning DVDs since the digital information within data layer 28 (FIG. 1) is much closer together than in conventional compact discs.

In a preferred embodiment, second diameter 114 is less than first diameter 112. First diameter 112 is greater than second diameter 114 so that closed cell foam pad 88 effectively provides support for radial projections 116 in order to prevent premature wear of the abrasive material at radial projections 116.

Radial projections 116 are shown as being uniform around perimeter 118 for clarity. However, it should be understood that radial projections need not be uniform. Rather, the depth and the shape of the scallop about perimeter 118 can vary as long as the resulting abrasion pattern resembles sloped edge 120.

In summary, the present invention teaches of an apparatus and buffing element that restore both the playback quality and the visual appearance of an optically-read digital recording disc. The apparatus includes a timing element that synchronizes the cessation of rotation of the disc and the buffing element to prevent excessive buffing of the protective coating. In addition, the buffing element is nearly parallel to the protective surface of the disc and positioned so as to uniformly buff a large surface area of the protective surface during a reconditioning process without damage to the text band of the disc. Furthermore, the foam structure of the buffing element provides adequate pressure to the protective surface of the disc to restore playback quality and the visual appearance to the disc. As further aid in the restoration of playback quality, the scallop pattern of the perimeter of the buffing pad imparts a generally uniform abrasion pattern with a gradual transition between unconditioned and reconditioned portions of the disc. The use of the silicone based closed cell foam and the stabilizer plate results in a cost effective and durable buffing element.

Although the preferred embodiments of the invention have been illustrated and described in detail, it will be readily apparent to those skilled in the art that various modifications may be made therein without departing from the spirit of the invention or from the scope of the appended claims. For example, a single foam pad having the properties of adequate compression characteristics, resistance to water, and ready adhesion and removal of pressure sensitive adhesives may be substituted for the closed cell foam pad and the first open cell closed cell foam pad juxtaposed between the stabilizer plate and the buffing pad. In addition, the buffing element may be adapted for use in other buffing or polishing applications, such as on the finish of a vehicle, on plastic or fiberglass surfaces, and so forth.

What is claimed is:

1. In an apparatus for reconditioning a protective surface of an optically-read digital recording disc, a buffing element comprising:

a substantially rigid stabilizer plate having a plate surface;

a closed cell foam pad fixedly engaged with said plate surface;

an open cell foam pad juxtaposed between and coupled to said closed cell foam pad and said plate surface of said stabilizer plate; and a buffing pad in fixed relation with said foam pad, said buffing pad having first and second surfaces on opposing sides of said buffing pad, said first surface being configured to face said foam pad, and said second surface being configured to contact and recondition said protective surface of said digital recording disc.

2. In an apparatus for reconditioning a protective surface of an optically-read digital recording disc, a buffing element comprising:

a substantially rigid stabilizer plate having a plate surface;

a silicone coated closed cell foam pad fixedly engaged with said plate surface; and a buffing pad in fixed relation with said foam pad, said buffing pad having first and second surfaces on opposing sides of said buffing pad, said first surface being configured to face said foam pad, and said second surface being configured to contact and recondition said protective surface of said digital recording disc.

3. In an apparatus for reconditioning a protective surface of an optically-read digital recording disc, a buffing element comprising:

a substantially rigid stabilizer plate having a plate surface;

a foam pad fixedly engaged with said plate surface, said foam pad exhibiting a first diameter; and a buffing pad in fixed relation with said foam pad, said buffing pad having first and second surfaces on opposing sides of said buffing pad, said first surface being configured to face said foam pad, said second surface being configured to contact and recondition said protective surface of said digital recording disc, and said buffing pad exhibiting a second diameter, said second diameter being less than said first diameter.

4. In an apparatus for reconditioning a protective face of an optically-read digital recording disc, a buffing element comprising:

a substantially rigid stabilizer plate having a plate surface;

a foam pad fixedly engaged with said plate surface;

a buffing pad in fixed relation with said foam pad, said buffing pad having first and second surfaces on opposing sides of said buffing pad, said first surface being configured to face said foam pad, said second surface being configured to contact and recondition said protective surface of said digital recording disc, and said buffing pad including radial projections along a perimeter of said buffing pad; and a turntable for rotating said buffing element such that when said buffing element rotates upon said turntable, said radial projections impart a sloped edge on a border between an unconditioned portion and a reconditioned portion of said protective surface of said disc.

5. In an apparatus for reconditioning a protective surface of an optically-read digital recording disc, a buffing element comprising:

a substantially rigid stabilizer plate having a first plate surface and a second plate surface on an opposite side of said stabilizer plate from said first plate surface;

a first foam pad fixedly engaged with said first plate surface;

a second foam pad coupled to said second plate surface of said stabilizer plate; and a buffing pad in fixed relation with said first foam pad, said buffing pad having first and second surfaces on opposing sides of said buffing pad, said first surface being configured to face said first foam pad, and said second surface being configured to contact and recondition said protective surface of said digital recording disc.

6. A buffing element as claimed in claim 5 wherein said second foam pad is an open cell foam pad.

7. A buffing element in an apparatus for reconditioning a protective surface of an optically-read digital recording disc, said apparatus including a turntable for rotating said buffing element, said buffing element comprising:

a substantially rigid stabilizer plate having a plate surface;

an open cell foam pad coupled to said plate surface;

a closed cell foam pad coupled to said open cell foam pad; and a buffing pad having first and second surfaces on opposing sides of said buffing pad, said first surface being configured to couple to said closed cell foam pad, said second surface being configured to contact and recondition said protective surface of said digital recording disc, and said buffing pad including projections along a perimeter of said buffing pad for imparting a gradually sloped edge on a border between an unconditioned portion and a reconditioned portion of said protective surface of said disc when said buffing element rotates upon said turntable.

8. A buffing element as claimed in claim 7 wherein said first surface of said buffing pad includes an adhesive layer that removably adheres to said foam pad.

9. A buffing element as claimed in claim 7 wherein said closed cell foam pad is a silicone based closed cell foam pad to which said buffing pad removably adheres.

10. A buffing element as claimed in claim 7 wherein:

said open cell foam pad exhibits a first diameter; and said buffing pad exhibits a second diameter, said second diameter being less than said first diameter.

11. A buffing element as claimed in claim 7 wherein:

said plate surface of said stabilizer plate is a first plate surface;

said stabilizer plate further includes a second plate surface on an opposite side of said stabilizer plate from said first plate surface; and said buffing element further comprises a third foam pad coupled to said second plate surface of said stabilizer plate.

12. An apparatus for reconditioning a protective surface of an optically-read digital recording disc, said apparatus comprising:

a turntable configured to receive a center section of said optically-read disc, said center section being located about a center hole of said optically-read disc;

a first motor, coupled to said turntable, for rotating said turntable and said optically-read disc at a first rotational speed;

a buffing element for removing an amount of material from said protective surface as said turntable rotates said optically-read disc through at least one revolution, said buffing element including:

a substantially rigid stabilizer plate having a plate surface;

a foam pad fixedly engaged with said plate surface; and a buffing pad in fixed relation with said foam pad, said buffing pad having first and second surfaces on opposing sides of said buffing pad, said first surface being configured to face said foam pad, and said second surface being configured to recondition said protective surface of said digital recording disc;

a second motor, coupled to said buffing element, for rotating said buffing element at a second rotational speed; and a timing element, in communication with each of said first and second motors, for synchronizing said first and second motors to substantially simultaneously cease rotation of said turntable and said buffing element following removal of said amount of material.

13. An apparatus as claimed in claim 12 wherein:

said foam pad of said buffing element exhibits a first diameter; and said buffing pad of said buffing element exhibits a second diameter, said second diameter being less than said first diameter.

14. An apparatus as claimed in claim 12 wherein said buffing pad of said buffing element includes projections along a perimeter of said buffing pad for imparting a gradually sloped edge on a border between an unconditioned portion and a reconditioned portion of said protective surface of said disc when said buffing element rotates upon said turntable.

15. An apparatus as claimed in claim 12 wherein said foam pad includes a closed cell silicone foam pad to which said buffing pad removably adheres.

* * * * *